(12) United States Patent
Ishikawa et al.

(10) Patent No.: US 8,464,830 B2
(45) Date of Patent: Jun. 18, 2013

(54) SOUNDPROOF MATERIAL FOR VEHICLE

(75) Inventors: Masaki Ishikawa, Anjo (JP); Hidekimi Takahashi, Nishio (JP); Yuji Mori, Miyoshi (JP); Hiroyuki Honda, Anjo (JP)

(73) Assignee: Takehiro Co., Ltd., Anjyo-Shi, Aichi-Ken (JP)

( * ) Notice: Subject to any disclaimer, the term of this patent is extended or adjusted under 35 U.S.C. 154(b) by 0 days.

(21) Appl. No.: 13/413,692

(22) Filed: Mar. 7, 2012

(65) Prior Publication Data
US 2012/0234626 A1    Sep. 20, 2012

(30) Foreign Application Priority Data
Mar. 14, 2011   (JP) .................................. 2011-55986

(51) Int. Cl.
*E04B 1/82* (2006.01)
(52) U.S. Cl.
USPC ........................................................ 181/290
(58) Field of Classification Search
USPC .......................................... 181/210, 290, 296
See application file for complete search history.

(56) References Cited

U.S. PATENT DOCUMENTS
2009/0026010 A1* 1/2009 Saito et al. ................... 181/290

FOREIGN PATENT DOCUMENTS

| JP | 63-56614 U | 4/1988 |
|---|---|---|
| JP | 6-328479 A | 11/1994 |
| JP | 8-258131 A | 10/1996 |
| JP | 10-16659 A | 1/1998 |
| JP | 2001-1396 A | 1/2001 |
| JP | 2001-347900 A | 12/2001 |
| JP | 2002-178397 A | 6/2002 |
| JP | 2004-090532 A | 3/2004 |
| JP | 2005-227747 A | 8/2005 |
| JP | 2005-335684 A | 12/2005 |

* cited by examiner

*Primary Examiner* — Jeremy Luks
(74) *Attorney, Agent, or Firm* — Matthias Scholl, PC; Matthias Scholl

(57) ABSTRACT

A first sound absorbing material to be located facing a vehicle room interior side, the air-impermeable material having an air-impermeable film having bonding hot-melts on both sides thereof, and the second sound absorbing material to be located facing a vehicle room exterior side are laminated in this order, and are closely-located between two heating boards and are supplied with hot air to melt hot-melts and thus to make a laminate. The laminate is cold press molded with the first sound absorbing material on a lower mold, and at the same time as the press molding, compressed gas is supplied from an upper mold to apply pressure on the air-impermeable material and thus to compression mold the first sound absorbing material.

2 Claims, 7 Drawing Sheets

SOUNDPROOF MATERIAL FOR VEHICLE

CROSS-REFERENCE TO RELATED APPLICATIONS

Pursuant to 35 U.S.C. §119 and the Paris Convention Treaty, this application claims the benefit of Japanese Patent Application No. 2011-55986 filed Mar. 14, 2011, the contents of which are incorporated herein by reference.

BACKGROUND OF THE INVENTION

1. Field of the invention

The present invention relates to a soundproof material for vehicle to keep a room interior of a vehicle such as an automobile silent, and more specifically relates to a soundproof material for vehicle with an enhanced soundproof property and an enhanced productivity.

2. Description of the Related Art

Not only a soundproof property but also accuracy improvement and a thinner-wall structure have been required for a soundproof material for vehicle due to a necessity of making a vehicle room interior more spacious. As a matter of course, it has been required at the same time to save production processes and production time. Accordingly, a soundproof material for vehicle has been generally produced by laminating a sound absorbing material and a sound insulating material and then molding them by a pressing machine in order to meet requirements of solving a spacious restriction, with ensuring sound absorbing and sound insulating properties, and saving production processes at the same time. The sound absorbing material and the sound insulating material can be bonded to each other, for example, by a method of using a melted thermoplastic resin, namely a hot-melt, between them and cold pressing them just after melting them.

Japanese Patent Laid-Open No. 2005-227747 discloses an invention of a sound insulator having an object of raising transmission loss in a medium to high frequency domain generally having less transmission loss. It has an object of improving sound absorption in a medium to high frequency domain to which frequency of human conversation pertains. It also has an object of ensuring sufficient sound absorption even in a thin-wall sound absorption layer of an actual odd-shaped product and an object of reducing the weight of a sound insulator.

However, conventional methods of compression molding and thin-wall structure with high soundproof property disclosed in Japanese Patent Laid-Open No. 2005-227747 are still insufficient, in some cases, to meet high requirements of product thickness and soundproof property. Additionally, if one of layers is to be compressed particularly relative to other layers, amount of compression and thickness of the compressed layer were limited.

BRIEF SUMMARY OF THE INVENTION

The object of the present invention is thus to provide a soundproof material for vehicle that can meet high requirements of thickness, accuracy and soundproof property of the product at the same time, and that can further reduce production cost.

In the present invention, it is preferable that, after forming, trimming of the product is performed by amplifying the press stroke in the mold clamped state during the press molding. For example, position of a press bottom dead center can be lowered in the mold clamped state of the molding by drawing a movable bottom dead center block provided on the upper mold to amplify the press stroke and to perform trimming of the product after forming. The press stroke may be also controlled electrically.

In the present invention, it is preferable that the laminate is made by laminating said first sound absorbing material, said air-impermeable material and said second sound absorbing material in this order, closely-locating them between two heating boards, supplying hot air through holes formed in said heating boards, and melting said hot-melts.

In the present invention, compressed-air compression means compression of a product material by supplying compressed gas. This action is different from press molding by a mold clamping force.

In the present invention, it is preferable that the first sound absorbing material has a thickness of 1 to 20 mm and an area weight of 100 to 2000 g/m$^2$ before being press molded and has a thickness of 0.5 to 15 mm and an area weight of 100 to 2000 g/m$^2$ after being press molded. It is also preferable that the second sound absorbing material has a thickness of 3 to 50 mm and an area weight of 300 to 4000 g/m$^2$ before being press molded and has a thickness of 1 to 50 mm and an area weight of 300 to 4000 g/m$^2$ after being press molded.

The first sound absorbing material and the second sound absorbing material may be made of a same material or may be made of different materials. These sound absorbing materials are preferably made of a thermoplastic felt using a thermoplastic resin as a binder. Additionally, felts of polyethylene terephthalate (PET), wool or cotton, a urethane mold, a urethane foam slab, and RSPP (Recycled Sound-Proofing Products) can be used for these sound absorbing materials.

Either or both of the first sound absorbing material and the second sound absorbing material may be made of a single material or multiple materials and may have a density gradient with a higher density side and a lower density side.

The air-impermeable material is preferably an air-impermeable film. The film has preferably a thickness of 5 to 500 μm. An olefin resin film, a polyester film such as a polyethylene terephthalate film, a polyurethane resin film, a metal such as aluminum, and their compound material can be used for the film. The film made of these materials preferably has a melting temperature of 80 to 250° C.

The air-impermeable material may be made of an air-impermeable foam. The air-impermeable foam is preferably an olefin foam such as a polypropylene foam (PPF) and a polyethylene foam (PEF). The foam preferably has a thickness in a range of 1 to 7 mm, an area-weight of not greater than 600 g/m$^2$, and a melting temperature in a range of 130 to 170° C.

The bonding hot-melts are preferably thermoplastic films each having a thickness of 5 to 500 μm in a case of a film and an amount of application of 5 to 200 g/m$^2$ in a case of application, and a melting temperature of 60 to 200° C. The melting temperature of the bonding hot-melts is set to be lower than that of the air-impermeable film or foam.

According to the present invention, as the air flow between the first sound absorbing material and the second sound absorbing material are shut off by the air-impermeable material, if compressed gas is supplied to the second sound absorbing material during press molding, the air-impermeable material can be pushed by compressed gas supplied to the second sound absorbing material, and the first sound absorbing material can be compressed-air compressed via the air-impermeable material. As the compressed-air compression does not act on the air-permeable second sound absorbing material, partial control of thickness in the laminating direction can be made possible.

By controlling supplied compressed gas, action of this compressed-air compression can be made very strong. This can increase compression rate of only the first sound absorbing material while ensuring thickness of the whole product. In addition, as this forming process is performed in an integral manner, the production cost can be reduced. Thus, density can be raised only in part of layers of sound absorbing materials even though the forming is performed in one process. Accordingly, the present invention can meet various requirements such as a requirement for combining a thinner-wall structure and improved soundproof property, a requirement for improved product accuracy, and a requirement for cost saving.

Additionally, as flatly press crushed parts are made by flatly crushing an area where trimming of the product outer shape is to be performed by a mold clamping force at the same time as forming a product shape, escape of the supplied compressed gas from the sides of the laminate can be prevented. This can raise the compression rate of the first sound absorbing material by the compressed-air compression with thickness of the second sound absorbing material being ensured. This also has an advantage that more reliable cutting can be performed, as the flatly press crushed areas are cut when trimming.

According to the present invention, by changing press stroke, forming of the convex-concave shape of the product and trimming of the product outer shape and the hole can be performed successively at the same time in one forming action. Thus, three processes of forming the first sound absorbing material, forming the second sound absorbing material, and trimming can be put together in one process with reducing the production processes significantly. Accuracy is also improved without positioning error of the production shape and trimming process, because it is not necessary to position again in a later separate trimming process.

According to the present invention, when melting the hot-melts to make the laminate, direct heating from the heating boards is performed, and at the same time, supplied hot air can be sent without loss to the bonding hot-melts to bond the air-impermeable material. In a case of a hot air furnace, a laminate is heated by blowing hot air against the laminate. However, in such a case, heat cannot reach to an internal air-impermeable material and hot-melts quickly, because the air-impermeable material prevents air flow and causes hot air to escape along the surface of the sound absorbing material, and thus hot air cannot easily enter into the material. According to the present invention, the laminate is heated by closely-locating the laminate between the heating boards and supplying the hot air from holes. Therefore, heat can be supplied effectively to the air-impermeable material without loss of hot air.

In certain aspects of the invention, provided is also a method for producing a soundproof material for vehicle, comprising:

a lamination step for making a laminate by laminating a first sound absorbing material to be located facing a vehicle room interior side, an air-impermeable material having hot-melts located on both sides thereof, and a second sound absorbing material to be located facing a vehicle room exterior side in this order, heating them, and closely-locating them between two heating boards, supplying hot air through holes formed in said heating boards, and melting said hot-melts, a shaping step for shaping a flatly press crushed part by flatly crushing an area where trimming of a product outer shape is to be performed by a mold clamping force, when molding the laminate, and a compressed step for compressed-air compressing said first sound absorbing material via said air impermeable material by supplying compressed gas to said second sound absorbing material through either one of a upper mold or a lower mold and evacuating air in said first sound absorbing material outside said molds through a evacuating hole formed in the other one of said upper mold or said lower mold, thereby integrally bonding and forming said first sound absorbing material, said air-impermeable material and said second sound absorbing material.

In certain embodiments, the method for producing the soundproof material for vehicle further comprises a trimming step for trimming said laminate by amplifying a press stroke in said mold clamped state of said press molding after said forming.

In certain other aspects of the invention, provided is also a method for producing a soundproof material for vehicle, comprising:

a step of making a laminate by laminating a first sound absorbing material to be located facing a vehicle room interior side, an air-impermeable material having hot-melts located on both sides thereof, and a second sound absorbing material to be located facing a vehicle room exterior side in this order, heating them, and melting said hot-melts, a step of shaping a first flatly press crushed part and a second flatly press crushed part respectively by flatly crushing an outer periphery of an area where trimming of a hole is to be preformed and an inner periphery of an area where trimming of a product outer shape is to be performed by a mold clamping force, when press molding the laminate, and a step of compressed-air compressing said first sound absorbing material via said air impermeable material by supplying compressed gas to said second sound absorbing material through either one of a upper mold or a lower mold in a state escape of the compressed gas supplied in said laminate is prevented by said flatly crushed parts, and evacuating air in said first sound absorbing material outside said molds through a evacuating hole formed in the other one of said upper mold or said lower mold, thereby integrally bonding and forming said first sound absorbing material, said air-impermeable material and said second sound absorbing material.

BRIEF DESCRIPTION OF THE DRAWINGS

The invention is described hereinbelow with reference to accompanying drawings, in which.

DETAILED DESCRIPTION OF THE INVENTION

Figure 1:
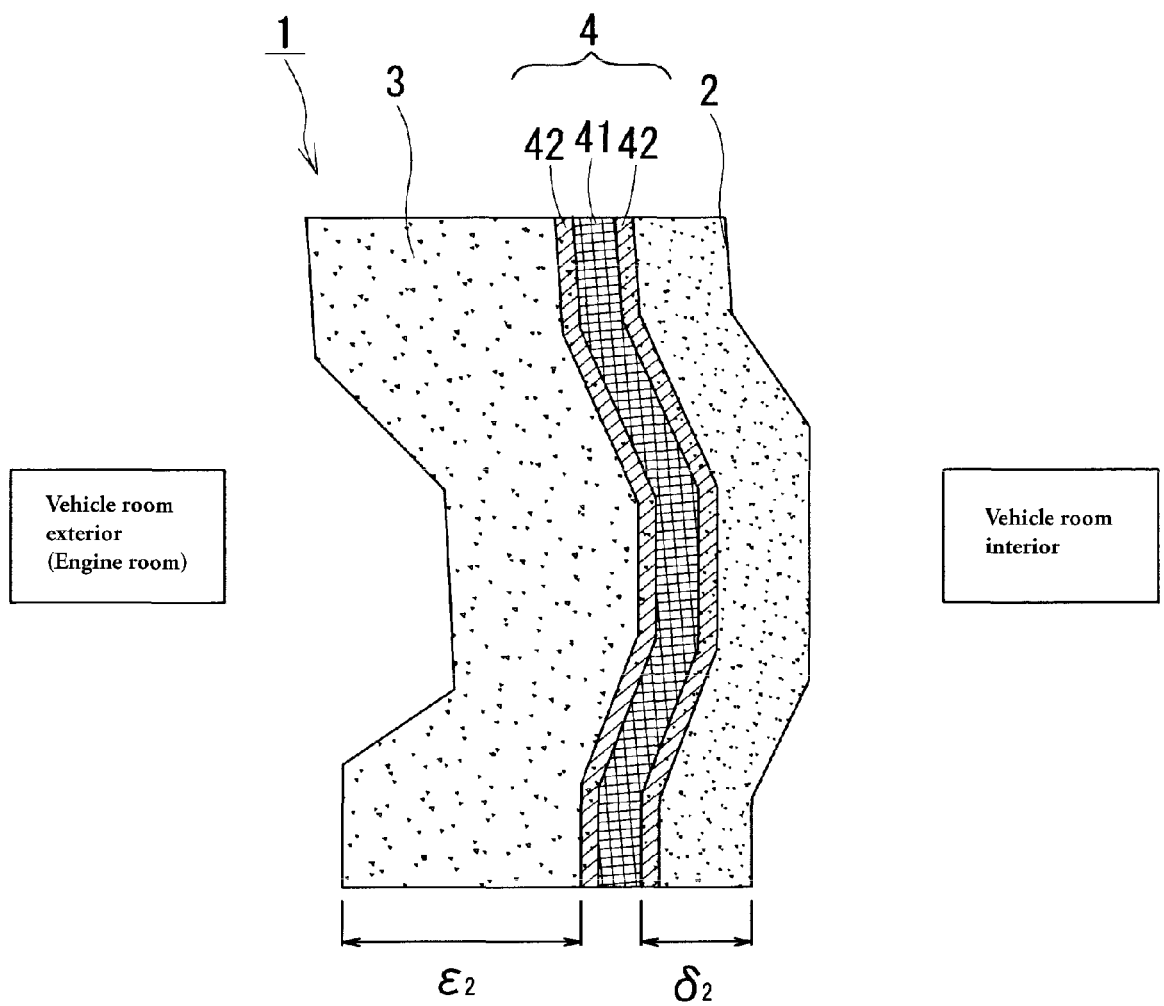
FIG. 1 is a cross-sectional schematic view showing a position of a soundproof material for vehicle 1 in an embodiment of the present invention when assembled to a vehicle.

The structure of a soundproof material for vehicle 1 in an embodiment of the present invention is discussed below with reference to FIG. 1.

A soundproof material for vehicle 1 includes a first sound absorbing material 2 to be located facing a vehicle room interior side when assembled to a vehicle, a second sound absorbing material 3 to be located facing a vehicle room exterior side when assembled to a vehicle, and an air-impermeable material 4 located between the first sound absorbing material 2 and the second sound absorbing material 3. The air-impermeable material 4 includes an air-impermeable film 41 made of an air-impermeable material and melted hot-melts 42 located on both side thereof. The first sound absorbing material 2 and the second sound absorbing material 3 are bonded by the hot-melts 42.

The first sound absorbing material 2 can have any thickness in a range of 0.5 to 15 mm and an area-weight in a range of 100 to 2000 g/m$^2$. For example, the first sound absorbing material 2 is made of a thermoplastic felt having an air-permeability and has a thickness of 5 mm and an area-weight of 800 g/m$^2$.

The second sound absorbing material 3 can have any thickness in a range of 1 to 50 mm and an area-weight in a range of 300 to 4000 g/m$^2$. For example, the second sound absorbing material 3 is made of a thermoplastic felt having an air-permeability and has a thickness of 15 mm and an area-weight of 800 g/m$^2$.

The first sound absorbing material 2 and the second sound absorbing material 3 are preferably made of a thermoplastic felt using a thermoplastic resin as a binder. Additionally, felts of polyethylene terephthalate (PET), wool or cotton, a urethane mold, a urethane foam slub, and RSPP can be used for these sound absorbing materials.

Figure 6A:
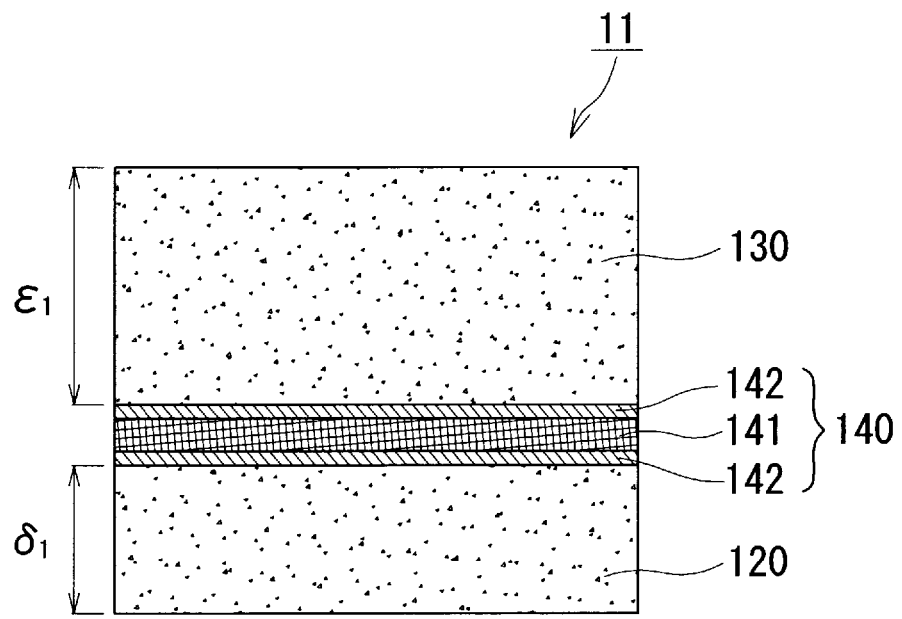
FIG. 6A is a schematic view showing a laminate 11 in the same embodiment before hot air heating.

An air-impermeable material 140 includes an air-impermeable film 141 and bonding hot-melts 142 (see FIG. 6A). The air-impermeable film 141 is a thermoplastic resin film having a thickness of 15 μm and a melting temperature of 198° C. The thermoplastic resin film can have any thickness in a range of 5 to 500 μm and preferably has a melting temperature in a range of 80 to 250° C. An olefin resin film, a polyester film such as a polyethylene terephthalate (PET) film, a polyurethane resin film, and their compound material can be used for the thermoplastic resin film. A metal such as aluminum can be used for film The air-impermeable film may be made of an air-impermeable foam. The air-impermeable foam is preferably an olefin foam such as a polypropylene foam (PPF) and a polyethylene foam (PEF). The foam preferably has a thickness in a range of 1 to 7 mm, an area-weight of not greater than 600 g/m$^2$, and a melting temperature in a range of 130 to 170° C.

Figure 6B:
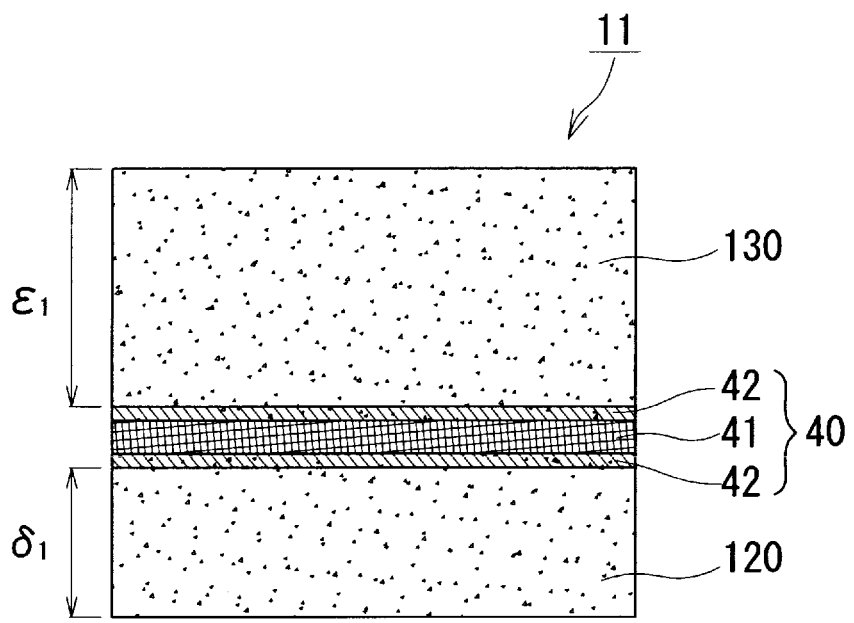
FIG. 6B is a schematic view showing a laminate 11 in the same embodiment after hot air heating and before press molding.

The bonding hot-melts 142 are thermoplastic resin films each having a thickness of 15 μm and a melting temperature of 120° C. (see FIG. 6A). The bonding hot-melts 142, each located between the first sound absorbing material 120 and the air-impermeable film 141 and between the second sound absorbing material 130 and the air-impermeable film 141, are melted to become melted hot-melts 42 and then integrally bonded and solidified with them (see FIG. 6B). The bonding hot-melts 142 before being melted preferably have a thickness in a range of 5 to 500 μm, and an area-weight (an amount of application when the bonding hot-melts 142 are not in a form of a film) of 5 to 200 g/m$^2$.

A thermoplastic resin film having a melting temperature significantly lower than that of the air-impermeable film 141 is used for the bonding hot-melts 142. The bonding hot-melts 142 should not necessarily be in a form of a film, and may be in a form of a powder or the like only if it is applicable as hot-melts. Both of whole-area bonding and partial bonding are applicable for these cases. Whole-area bonding may be applicable in cases of bonding films. A polyamide resin, an EVA resin, a urethane resin, a chloroprene latex (CR) resin, a styrene-butadiene polymer (SBR) resin, acryl resin or olefin resin may be used for material of the bonding hot-melts 142. However, a material having a necessary adhesive force to sufficiently bond the air-impermeable film 141 between the first sound absorbing material 120 and the second sound absorbing material 130 should be used.

The production process of a soundproof material for vehicle 1 in an embodiment of the present invention is discussed below with reference to FIGS. 2 to 5. As shown in FIG. 6A, a laminate 11, which is a row material of the soundproof material for vehicle 1, includes a first sound absorbing material 120, a second sound absorbing material 130 and an air-impermeable material 140 (an air-impermeable film 141 and bonding hot-melts 142) laminated in a prescribed order. Kinds and properties of this raw material are already mentioned.

The first sound absorbing material 120 and the second sound absorbing material 130 are made of a thermoplastic felt having an air-permeability. Particularly, a thermoplastic felt using a thermoplastic resin as a binder is preferable. Additionally, felts of polyethylene terephthalate (PET), wool or cotton, a urethane mold, a urethane foam slub, and RSPP can be used. For example, they can be made by mixing a PET resin (a binder) having a low melting temperature into recycled PET fibers, accumulating the mixture on a conveyer belt to form a mat, heating and then pressing the mat into a desired form. Material and forming process of the raw fabric for the first sound absorbing material 120 and the second sound absorbing material 130 are not limited, provided that the raw fabric is made of a fiber assembly having a good sound absorbing property. For example, a thermosetting resin may be used as a binder instead of a thermoplastic resin. In such a case with a thermosetting resin impregnated as a binder, hot pressing may be adopted.

The first sound absorbing material 120 preferably has a thickness in a range of 1 to 20 mm, and an area-weight in a range of 100 to 2000 g/m$^2$. The second sound absorbing material 130 preferably has a thickness in a range of 3 to 50 mm, and an area-weight in a range of 300 to 4000 g/m$^2$.

As for the films of the air-impermeable film 141 and the bonding hot-melts 142 to constitute the air-impermeable material, an integrally laminated film (not shown) including the air-impermeable film 141 and bonding hot-melts 142 on both sides thereof may be prepared previously. This method is well-known and is disclosed in Japanese Patent Laid-Open No. 11-246831, for example. Not limited to this method, the air-impermeable film 141 and the bonding hot-melts 142 may be prepared separately without integration for using in a later process.

Figure 2A:
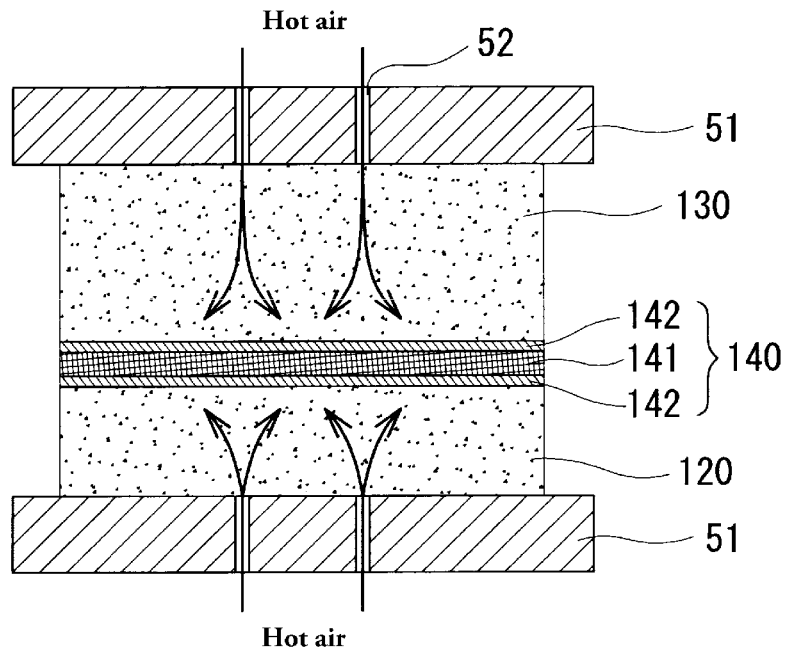
FIG. 2A is a schematic view showing a heating state of a laminate in an embodiment of the present invention.
Figure 2B:
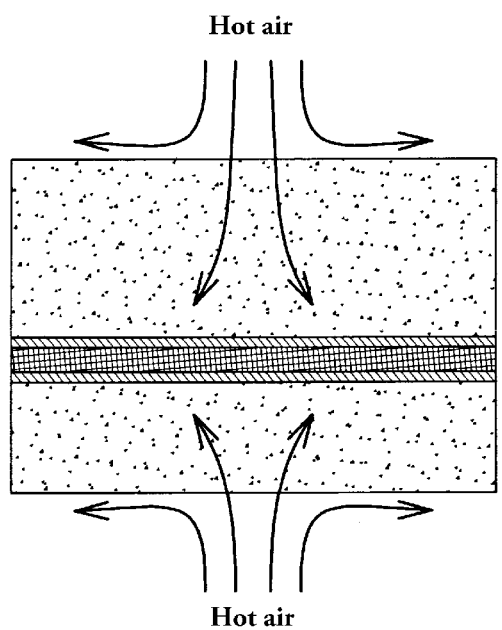
FIG. 2B is a schematic view showing a conventional heating state.

As shown in FIGS. 2 and 6A, the prepared first sound absorbing material 120, the air-impermeable material 140 (the bonding hot-melts 142 and the air-impermeable film 141 between the bonding hot-melts 142), and the second sound absorbing material 130 are laminated in this order, and are closely-located between two heating boards 51. Hot air is then blown to the first sound absorbing material 120 and the second sound absorbing material 130 via hot air supplying holes 52 formed in the heating boards 51 to melt the bonding hot-melts 142 into the melted hot melts 42 and thus to provide a laminate 11 including an air-impermeable material 40 with the melted hot-melts 42 (see FIG. 6B).

Figure 3:
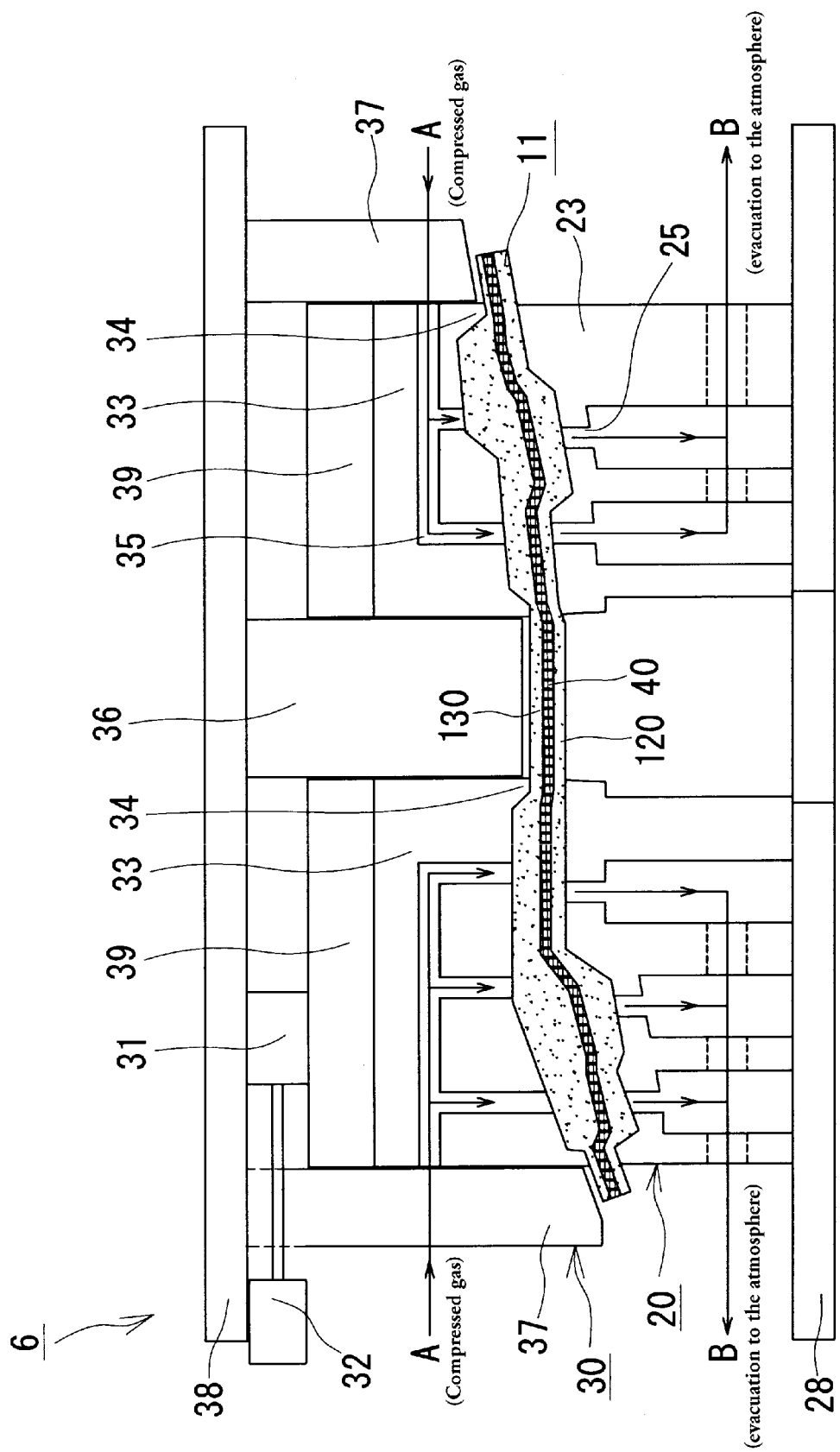
FIG. 3 is a schematic view showing a state of press molding at a position of a first press bottom dead center in the same embodiment of the present invention.
Figure 4:
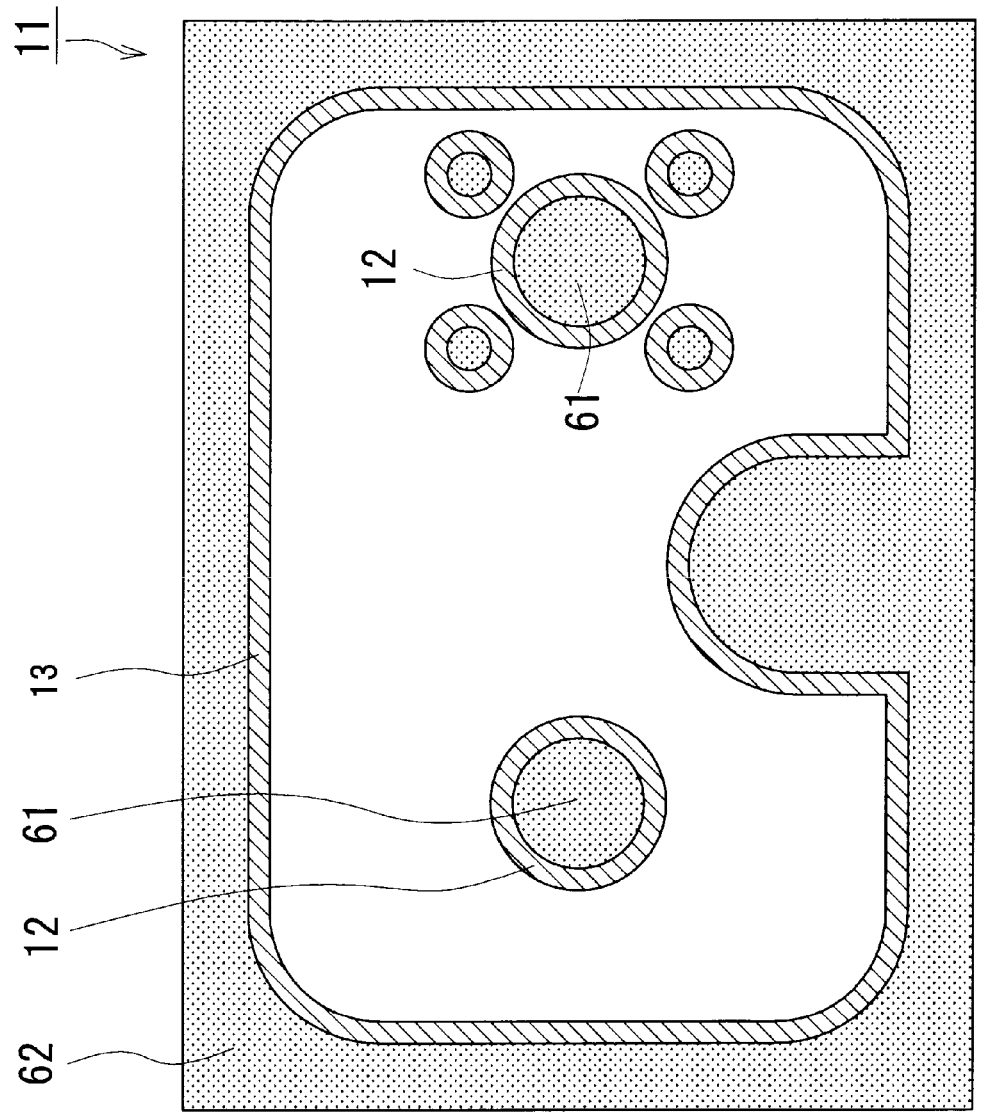
FIG. 4 is a plan view showing a flatly crushed state at the position of the first press bottom dead center in the same embodiment of the present invention, wherein the dotted areas show areas to be punched out, the shaded areas show flatly crushed areas in the soundproof material for vehicle, and the white area show an area not to be flatly crushed in a soundproof material for vehicle.

The laminate 11 is then set in a mold 6 having a desired shape with the side of the first sound absorbing material 2 on a lower mold 20, and is press-molded. FIG. 3 is a cross-sectional schematic view of the mold 6 showing a state of press molding and compressed-air compression. Some of the actual elements of the mold are omitted in the figure. The mold 6 includes an upper mold 30 having a movable bottom dead center block 31. Press stroke can be adjusted at two positions by inserting and drawing the movable bottom dead center block 31 using a cylinder 32. The state at a position of a first press bottom dead center is shown in FIG. 3. Stroke may be also controlled electrically without using the movable bottom dead center block 31. However, the embodiment of the present invention may include only the process before trimming. In such a case, the movable bottom dead center block 31 may not be used in the embodiment and trimming may be performed in a separate process.

The press molding is performed in a cold press method using a molding float 33 of the upper mold 30 and a molding die 23 of the lower mold. A special cooling system such as cooling pipes to exhaust heat may be or not may be equipped in the upper mold 30 and/or the lower mold 20 for cold press. During this press molding, a press pressure is transmitted directly to the laminate 11 via a compressed air sealing part 34 provided on the molding float 33 to flatly crush outer peripheries of areas to be punched out as scraps 61 (inner ones of dotted areas in FIG. 4) in a later process, and a inner periphery of an area to be trimmed away as a outer shape scrap 62 (outer one of dotted areas in FIG. 4) in a later process. First flatly press crushed parts 12 (inner ones of shaded areas in FIG. 4) and a second flatly press crushed part 13 (outer one of shaded areas in FIG. 4) which are even more compressed than other part are thus formed in the laminate 11. The flatly press crushed parts 12 and 13 are the parts formed by flatly crushing the laminates 11 by a mold clamping force. There is no airflow between the spaces in the laminate 11 separated by the flatly press crushed parts 12 and 13, and compressed air supplied into the laminate does not escape to the outside.

After press molding, compressed-air compression is performed at the same position of the first press bottom dead center (see FIG. 3). As shown in the arrow A in FIG. 3, compressed-air compression is performed by supplying compressed air from compressed air supplying holes 35 formed in the molding float 33 at an adequate interval. While the compressed air is supplied from the side of the second sound absorbing material 130 of the laminate 11, the pressure of the compressed air is applied to the air-impermeable material 40, as the second sound absorbing material 130 is air permeable. The pressed air-impermeable material 40 compresses the first sound absorbing material 120, and air in the first sound absorbing material 120 is evacuated to the atmosphere outside the mold through air evacuation holes 25 formed in the molding die 23, as shown in the arrow B in FIG. 3. A partial compression of the first sound absorbing material 120 can be thus performed by compressed air. When providing the amounts of compression of the first sound absorbing material 2 and the second sound absorbing material 3 as $\delta_1-\delta_2$ and $\epsilon_1-\epsilon_2$ respectively, the relation of $\delta_1-\delta_2 > \epsilon_1-\epsilon_2$ can be basically achieved (see FIG. 1, FIG. 6A and FIG. 6B). However, there are some areas such as areas around the holes where the relation is not applicable.

Figure 5:
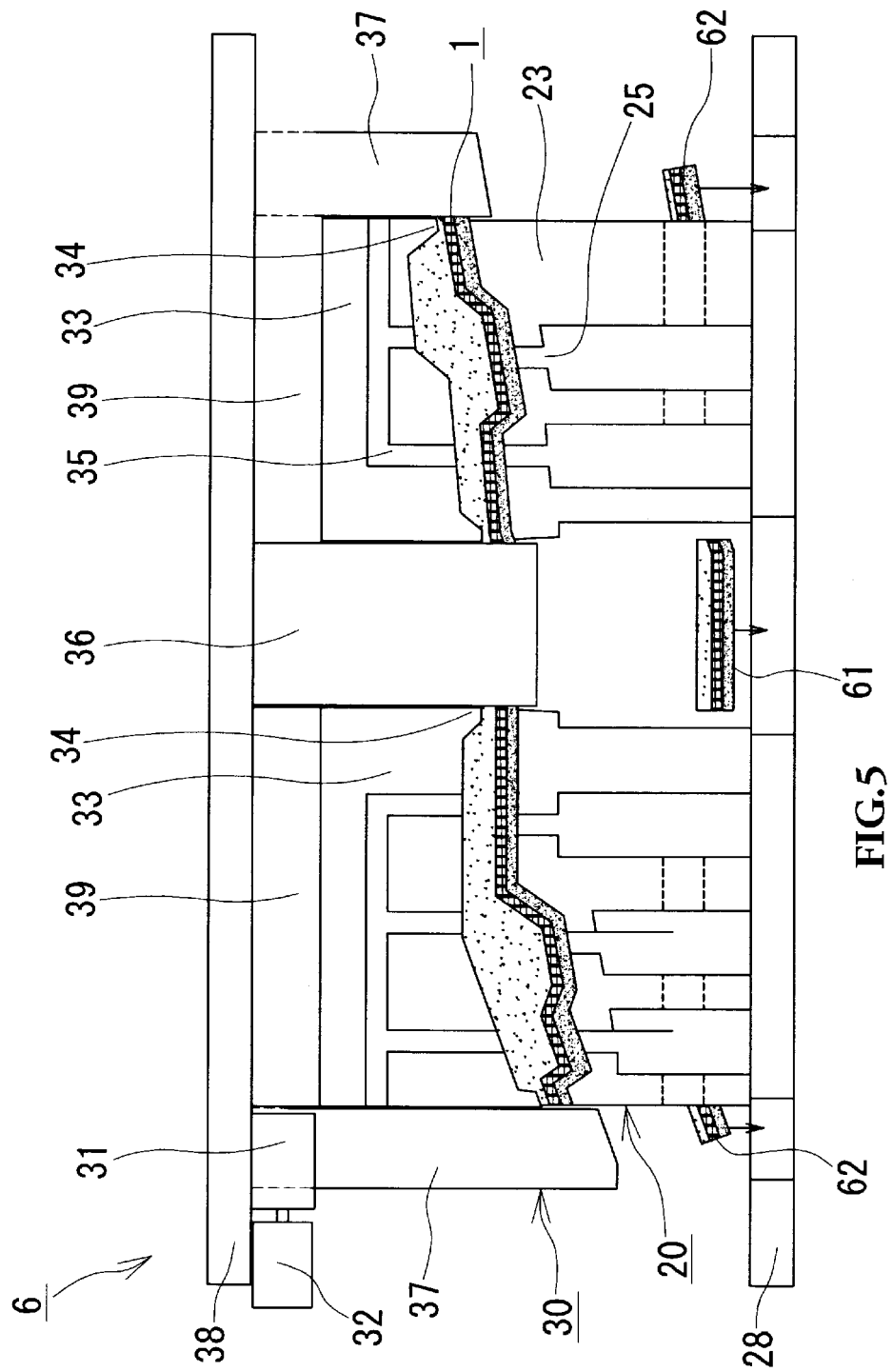
FIG. 5 is a schematic view showing a state of trimming at a position of a second press bottom dead center in the same embodiment of the present invention.

As shown in FIG. 5, after the above mentioned press molding and compressed-air compression, in the mold clamped state, the movable bottom dead center block 31 is drawn out using the cylinder 32 in order to amplify the press stroke and to lower the upper mold 30 to a second bottom dead center and thus to perform punching and external trimming of the product. After trimming, the upper mold 30 is raised, the movable bottom dead center block 31 is inserted to the same place where it is situated before being drawn out, and the soundproof material for vehicle 1 is taken out from the mold. When drawing out the movable bottom dead center block 31, mold clamping force is slacked off for a while by raising the upper mold 30 slightly to facilitate the drawing out of the movable bottom dead center block 31. By amplifying the press stroke, the formed laminate 11 is punched and externally trimmed by a punch 36 and a peripheral blade 37. The soundproof material for vehicle 1 is thus provided. The punch 36 and the peripheral blade 37 are fixed to the lower surface of a top board 38. A bottom dead center plate 39 is an element to regulate the lowest limits of the punch 36, the peripheral blade 37 and the top board 38.

The soundproof material for vehicle 1 produced as described above is used with the first sound absorbing material 2 facing the vehicle room interior side and the second sound absorbing material 3 facing the vehicle room exterior side as shown in FIG. 1.

Advantageous effects of the soundproof material for vehicle 1 in the embodiment of the present invention are described below. The soundproof material for vehicle 1 having the first sound absorbing material 2 with an enhanced compression rate can be achieved though a simple process using the compressed-air compression according to the present invention. A pressure higher than 0.1 MPa, which is the theoretical limit for vacuum suction, can be applied to enhance the compression rate of the sound absorbing material 2 by the compressed-air compression method by supplying compressed gas. Additionally the compression can be performed effectively regardless of thickness of the first sound absorbing material 2. Maximum pressure of the compressed-air compression is 1 MPa, for example. By enhancing the compression rate of the first sound absorbing material 2 as described above, rigidity of the soundproof material for vehicle 1 is enhanced, shape accuracy of the first sound absorbing material 2 facing the room interior side when assembled to a vehicle can be enhanced, and thus adaptability is enhanced.

Figure 7:
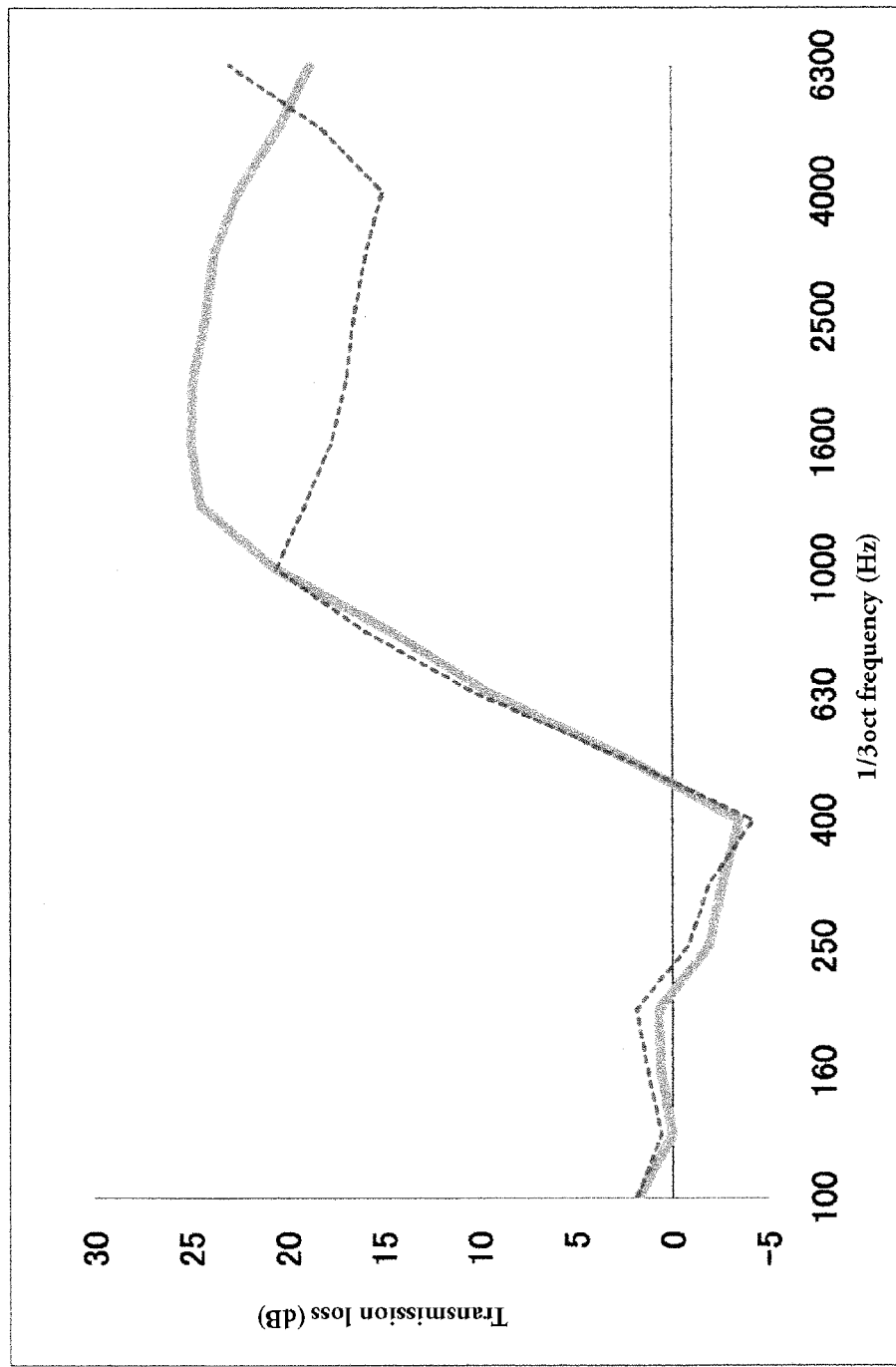
FIG. 7 shows a result of a comparative experiment comparing transmission loss of a soundproof material for vehicle 1 in an embodiment of the present invention and a conventional soundproof material.

A soundproof material having an unconventional sound insulating property can be achieved by greatly enhancing the compression rate of the first sound absorbing material 2 according to the present invention. FIG. 7 shows a result of a comparative experiment comparing a transmission loss of the soundproof material for vehicle 1 of the embodiment of the present invention with the highly compressed first sound absorbing material 2 by the compressed-air compression (0.3 MPa), with a transmission loss of a soundproof material for vehicle of a comparative example compressed with a pressure close to a pressure of vacuum compression (0.1 MPa). B&K PULSE. MS 1023 was used as measuring equipment. The measured frequency range was 100 to 6300 Hz. The size of a measured sample was 700 mm square. As for both of the samples of this embodiment and the comparative example, the first sound absorbing material 120 had a thickness of 10 mm and an area-weight of 1500 g/m², and the second sound absorbing material 130 had a thickness of 20 mm and an area-weight of 900 g/m², when they were in a state of raw material.

As the result of the comparative experiment, it is apparent that the transmission loss of the soundproof material of the present invention is higher than that of the comparative example in the frequency domain higher than 1000 Hz while there is no significant difference in the transmission loss between them in the frequency domain lower than 1000 Hz. It is due to the fact that the first sound absorbing material can be more intensively compressed in the soundproof material for vehicle 1 of the present invention while compression of thickness by vacuum molding method for the comparative example is limited. There is also an advantage that enough thickness of the second sound absorbing material 3 can be ensured.

In this embodiment, it is possible to prevent the compressed gas supplied from the compressed air supplying holes 35 from escaping from side surfaces of the laminate 11, due to the fact that the air-impermeable flatly press crushed parts 12, 13 are formed by the mold clamping force before performing compressed-air compression. This allows for higher compression rate of the first sound absorbing material 2 by compressed-air compression and enough thickness of the second sound absorbing material 3. When trimming, more reliable cutting action can be performed because the flatly press crushed parts 12, 13 are cut.

The press stroke is made variable between the first bottom dead center and the second bottom dead center by using the movable bottom dead center block 31. This makes possible to shape the flatly press crushed parts 12, 13 at the position of the first bottom dead center, by the mold clamping force, and at the same time, to trim the outer shape and the hole of the product by amplifying the press stroke to the second bottom dead center, in one forming process. Accordingly, three processes of forming the first sound absorbing material 2, forming the second sound absorbing material 3, and trimming can be put together in one process with reducing the production processes significantly, and at the same time, accuracy is improved without positioning error of the production shape and trimming process.

According to this embodiment, supplied hot air can be sent to the bonding hot-melts 142 without loss, because the bonding hot-melts are melted by supplying hot air from the hot air supplying holes 52 while the laminate 11 are closely-located between the two heating boards 51. Additionally form keeping ability and rigidity of the soundproof material for vehicle 1 can be improved because the thermoplastic binder in the first sound absorbing material 2 and the second sound absorbing material 3 can be also supplied with adequate heat.

The embodiments and their examples discussed above are to be considered in all aspects as illustrative and not restrictive. There may be many modifications, changes, and alterations without departing from the scope or spirit of the main characteristics of the present invention. All changes within the meaning and range of equivalency of the claims are therefore intended to be embraced therein. The scope and spirit of the present invention are indicated by the appended claims, rather than by the foregoing description.

All publications and patent applications mentioned in this specification are indicative of the level of skill of those skilled in the art to which this invention pertains. All publications and patent applications mentioned in this specification are herein incorporated by reference to the same extent as if each individual publication or patent application mentioned in this specification was specifically and individually indicated to be incorporated by reference.

What is claimed is:

1. A soundproof material for vehicle, comprising:
    a first sound absorbing material to be located facing a vehicle room interior side;
    a second sound absorbing material to be located facing a vehicle room exterior side; and
    an air-impermeable material having hot-melts located on both sides thereof;
    wherein
    said first sound absorbing material, said air-impermeable material and said second sound absorbing material are laminated in this order, and closely-located between two heating boards having through holes to melt said hot-melts by supplying hot air to said through holes and form a laminate,
    said laminate is press molded and a first flatly press crushed part and a second flatly press crushed part are shaped respectively by flatly crushing an outer periphery of an area where trimming of a hole is to be performed and an inner periphery of an area where trimming of a product outer shape is to be performed by a mold clamping force,
    said first sound absorbing material is compressed-air compressed via said air impermeable material by supplying compressed gas to said second sound absorbing material through either one of a upper mold or a lower mold in a state escape of the compressed gas supplied in said laminate is prevented by said flatly crushed parts, and evacuating air in said first sound absorbing material outside said molds through evacuating holes formed in other one of said upper mold or said lower mold, thereby integrally bonding and forming said first sound absorbing material, said air-impermeable material and said second sound absorbing material.

2. The soundproof material of claim 1, wherein the soundproof material is manufactured by:
    a) placing said first sound absorbing material to face the vehicle room interior side; placing said second sound absorbing material to face the vehicle room exterior side; placing said air-impermeable material in between said first sound absorbing material and said second sound absorbing material; and laminating said first sound absorbing material, said second sound absorbing material, and said air-impermeable material to form said laminate;
    b) placing said laminate between the two heating boards, and supplying hot air through the through holes to melt said hot-melts;
    c) setting said laminate in the mold, trimming said hole on said laminate; shaping said first flatly press crushed part by flattening an outer periphery of said hole; trimming said product outer shape by the mold clamping force; and shaping a second flatly press crushed part of said laminate by flattening an inner periphery of said product outer shape; and
    d) supplying compressed gas to said second sound absorbing material through one of the upper mold and the lower mold, whereby the compressed gas being prevented from escaping from said laminate by said first flatly press crushed part and said second flatly press crushed part; compressing said first sound absorbing material; and forcing air in said first sound absorbing material to evacuate outside the mold through an evacuating hole in the other one of the upper mold and the lower mold.

* * * * *